C. E. O. BORCK.
AUTOMOBILE LOCK.
APPLICATION FILED JUNE 19, 1920.
1,360,616.
Patented Nov. 30, 1920.
2 SHEETS—SHEET 1.
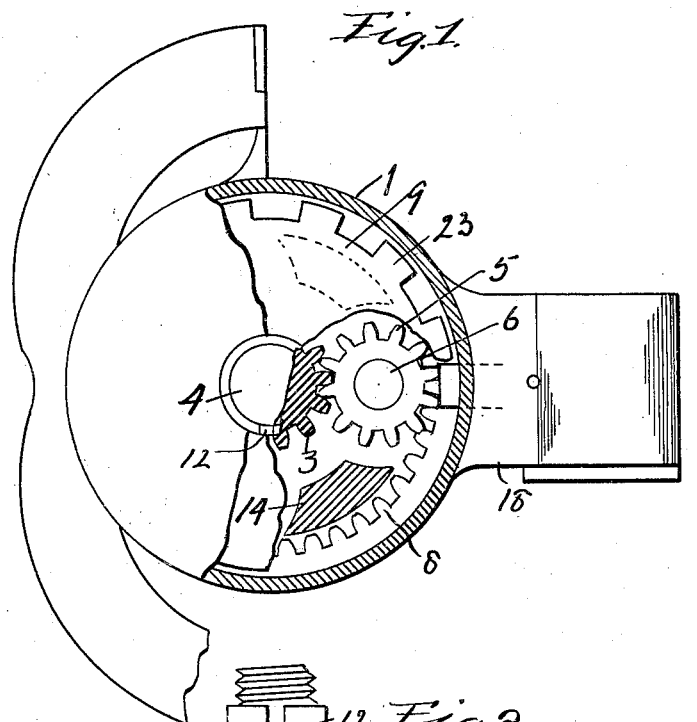
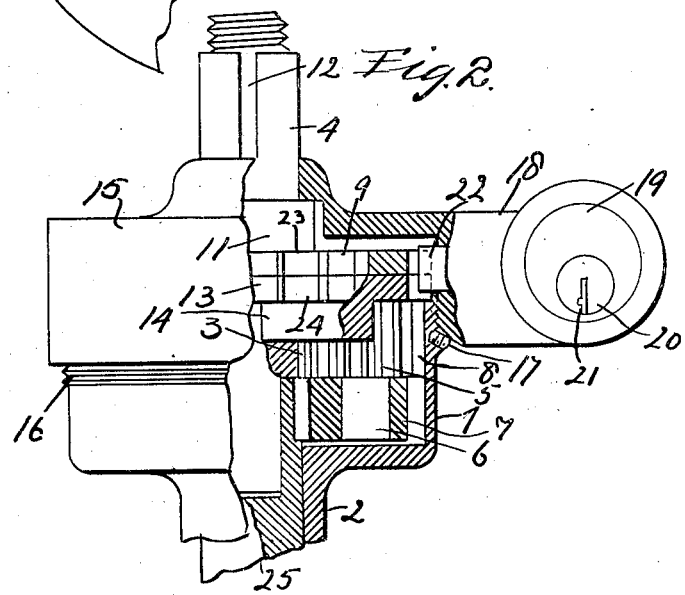
Inventor
Charles E. O. Borck
By W. W. Williamson
Atty.

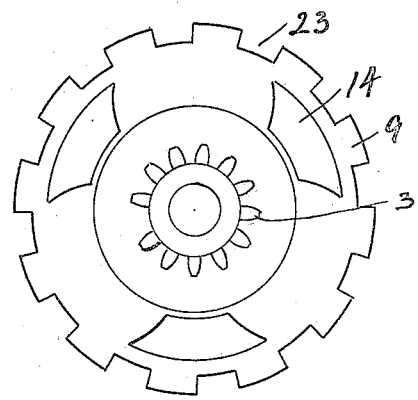
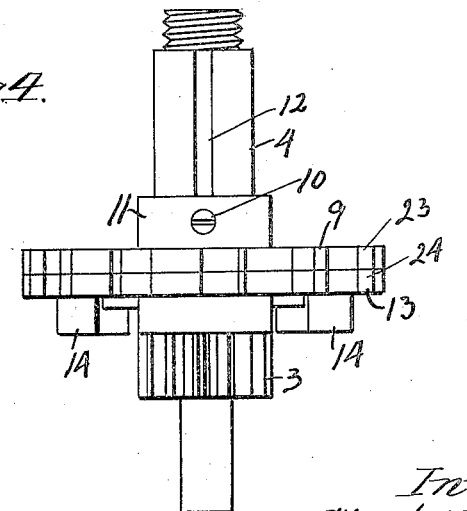

UNITED STATES PATENT OFFICE.

CHARLES E. O. BORCK, OF PHILADELPHIA, PENNSYLVANIA, ASSIGNOR TO WILLIAM A. RUTH, OF PHILADELPHIA, PENNSYLVANIA.

AUTOMOBILE-LOCK.

1,360,616.     Specification of Letters Patent.     Patented Nov. 30, 1920.

Application filed June 19, 1920. Serial No. 390,080.

*To all whom it may concern:*

Be it known that I, CHARLES E. O. BORCK, a citizen of the United States, residing at Philadelphia, in the county of Philadelphia and State of Pennsylvania, have invented new and useful Improvements in Automobile-Locks, of which the following is a specification.

My invention relates to a new and useful improvement in automobile locks, for locking the steering gear of an automobile to prevent the manipulation of the same by unauthorized persons, and my present invention is especially adapted for application to what is known as the Ford type of automobile, and has for its object to so construct a locking mechanism that when the same is applied to the steering gear mechanism of the type of machine above named the steering wheel post, the planetary pinions and the spider carrying the same may be locked together so as to prevent their independent rotation and by so doing prevent rotation of the steering post.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Figure 1, is a plan view of the steering mechanism of an automobile partly broken away and sectioned so as to show the interior construction thereof.

Fig. 2, is a side elevation of Fig. 1 also partly broken away and sectioned to show the parts contained within the casing.

Fig. 3, is a bottom plan view of the floating toothed disk showing it in place upon the steering wheel post.

Fig. 4, is an elevation of Fig. 2.

In carrying out my invention as here embodied, 1 represents the casing of an automobile of the type of the Ford, said casing being carried by the upper end of the steering post 2, and in this casing is located the planetary gear system consisting of a pinion 3 secured upon the lower portion of the steering wheel post 4, the pinions 5 which are journaled upon the studs 6 projecting from the spider 7 and the pinions 5 meshing with the pinion 3 and also with the internal gear teeth 8 formed upon the inner surface of the casing 1. This construction and arrangement is well known and forms no part of my invention except so far as these parts coact with my improved mechanism for producing the desired result.

The steering wheel post 4 has rigidly secured thereon the toothed disk 9 by means of the set screw 10 passing through the hub 11 of said disk and into the key way 12 formed in said post, or this disk may be secured to the post in any other well known or desirable manner, the only requirement being that it shall be rigidly fixed to the post and turned therewith.

13 represents a floating toothed disk which is loosely journaled upon the steering wheel post 4 so as to freely revolve about said post as a center. Formed with or secured to the under face of this floating disk are the lugs 14 which latter project downward into the casing between the pinions 5 so that as the spider carrying said pinions revolves the contact of the pinions against these lugs will cause the disk 13 to revolve in unison with said spider, or when the floating disk is held against rotation the impinging of the pinion 5 against these lugs will prevent the rotation of said spider.

15 represents a cap which is adapted to run upon the screw threads 16 formed upon the upper end of the casing 1, and these caps may be set and held in position by the set screw 17 or in any other convenient manner. This cap 15 has formed therewith a lock casing 18 in which is set a tumbler lock 19 having a pin tumbler barrel 20 fitted thereto so that by the insertion of the proper key within the key slot 21 the barrel may be turned for projecting or retracting the locking bolt 22, and the inner end of this bolt is adapted to pass between the teeth 23 formed upon the disk 9 and also between the teeth 24 formed upon the disk 13. When the locking bolt is shot into locking position and its inner end has entered into engagement with the teeth 23 and 24 it is obvious that the disks 9 and 13 will be locked together so that they may not move independent of each other and the disk 9 holding the steering wheel post 4 against rotation while the disk 13 through the lugs 14 will prevent the revolving of the spider 7 as before described, and as this spider is secured upon the steering post 25 said steering post will likewise be locked against rotation.

In the type of steering mechanism above referred to and here shown the revolving of the steering wheel post 4 effects the revolving of the spider as four to one, that is to say, four revolutions of the steering wheel post 4 will transmit one revolution to the spider and consequently to the steering post 25, therefore the toothed disk 13 which receives its motion from said spider through the pinions 5 will move around the common center at a less speed than the toothed disk 9, and I utilize this difference of motion to lock the two disks together in such manner as to relieve the strain which would otherwise be transmitted to the bolt 22 in holding the disks against rotation; for when the bolt is shot between the teeth of the two disks and said disks are thereby prevented from independent rotation the only strain which comes upon the bolt is a crushing strain exerted by the teeth of the two disks in an effort to pass out of alinement. Thus when an attempt is made to turn the steering wheel little or no strain comes upon the lock or the mechanism thereof since the movement of the disks are prevented by the crushing strain upon the bolt.

It is to be noted that when the bolt is shot into locked position the cap 15 will be held against removal from its casing thus effectually preventing tampering with the mechanism by unauthorized persons. While I have shown twelve teeth in each of the toothed disks 9 and 13 it is obvious that any desired number of teeth may be utilized, the only requirement being that the teeth shall be so spaced as to lock the steering mechanism of the automobile at the proper relative points.

While I have here shown a key tumbler lock it is obvious that a combination or any form of lock may be used which will provide for the projection of a bolt between the teeth of the disks and the retraction of said bolts.

Of course I do not wish to be limited to the exact details of construction as herein shown as these may be varied within the limits of the appended claims without departing from the spirit of my invention.

Having thus fully described my invention, what I claim as new and useful is:—

1. In combination with the steering mechanism of the character described, a disk rigidly secured to the steering wheel post, a floating disk loosely journaled concentric with the first named disk, means for rotating said floating disk in unison with the spider of said steering mechanism, and means for locking the two disks together.

2. In combination with the steering mechanism of the character described, a toothed disk rigidly secured to the steering post of said mechanism, a floating toothed disk loosely journaled concentric with the first named disk, lugs projecting downward from the floating disk for contact with the pinions carried by the spider of said steering mechanism, and means for locking said disks together.

3. In combination with the steering mechanism of the character described, a toothed disk rigidly secured to the steering post of said mechanism, a floating toothed disk loosely journaled concentric with the first named disk, lugs projecting downward from the floating disk for contact with the pinions carried by the spider of said steering mechanism, and a lock bolt adapted to be projected between the teeth of said disk or retracted therefrom.

4. The herein described combination of a stationary casing having gear teeth formed upon its internal circumference, a steering post projecting into said casing, a spider rigidly secured to said post, pinions journaled upon said spider meshing with said internal gear, a cap threaded upon said casing, said cap carrying a lock mechanism, a steering wheel post journaled in the cap, a pinion carried by the steering wheel post and meshing with the first named pinion, a toothed disk rigidly secured to the steering wheel post, a toothed floating disk loosely journaled upon said steering wheel post, and a bolt actuated by the lock mechanism and adapted to be projected between the teeth of said disks for locking them against independent rotation, and lugs projecting downward from the floating disk for engagement with the pinions carried by the spider.

In testimony whereof, I have hereunto affixed my signature.

CHARLES E. O. BORCK.